Oct. 14, 1924.
V. M. WEAVER
1,511,646
PROCESS OF MAKING CARBONYL HALIDE
Original Filed Jan. 7, 1918   3 Sheets-Sheet 3
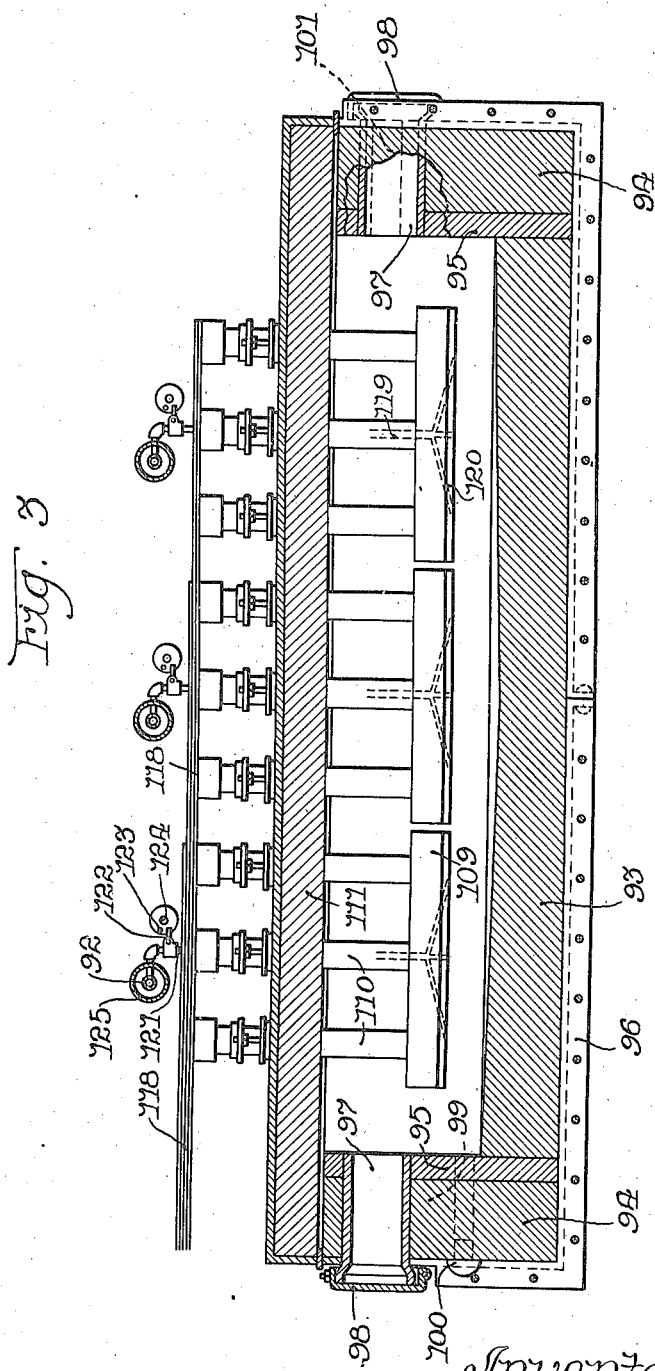
Inventor
Victor M. Weaver
By Brown, Hanson & Boettcher
Attorneys Patented Oct. 14, 1924.

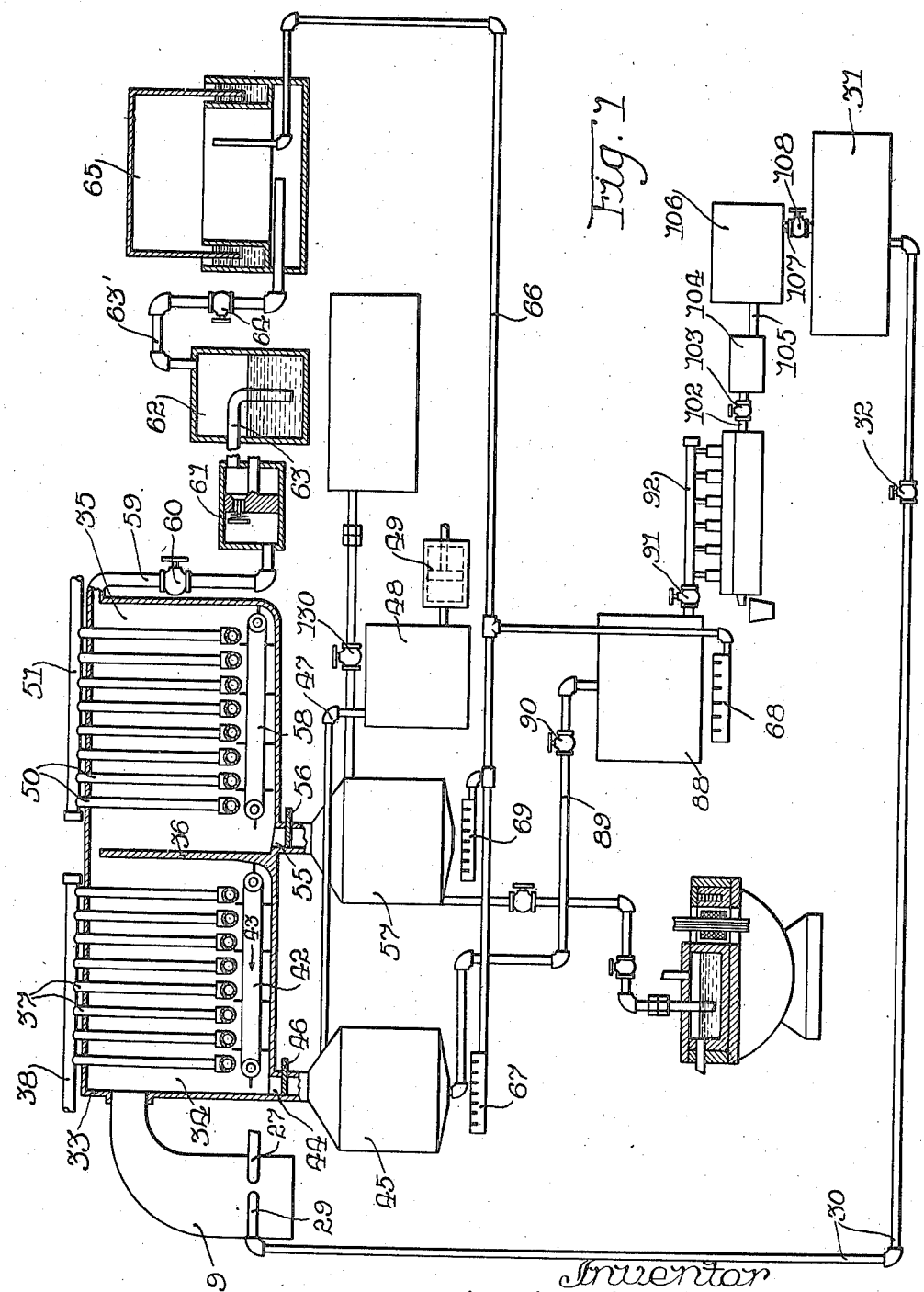

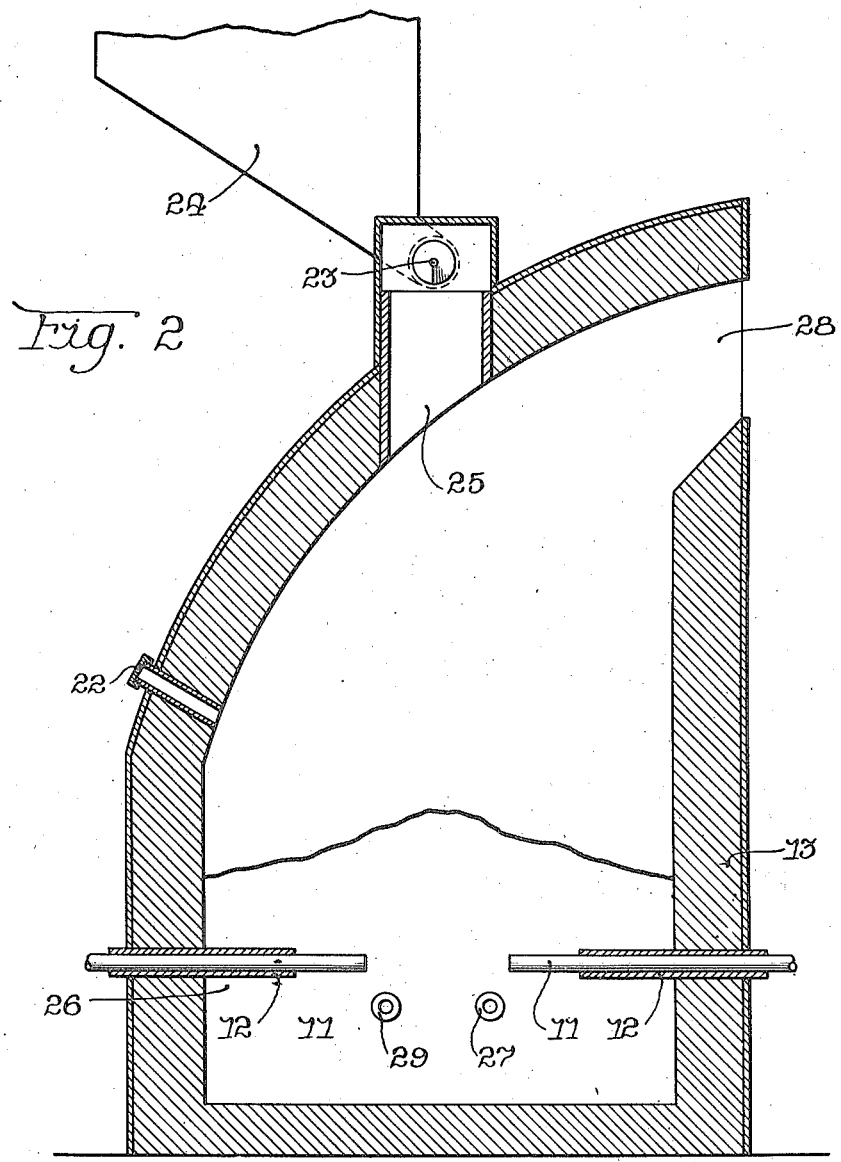

1,511,646

UNITED STATES PATENT OFFICE.

VICTOR M. WEAVER, OF THOROLD, ONTARIO, CANADA, ASSIGNOR TO WEAVER COMPANY, OF MILWAUKEE, WISCONSIN, A CORPORATION OF WISCONSIN.

PROCESS OF MAKING CARBONYL HALIDE.

Application filed January 7, 1918, Serial No. 210,609. Renewed April 23, 1923.

*To all whom it may concern:*

Be it known that I, VICTOR M. WEAVER, a citizen of the United States, residing at Thorold, in the Province of Ontario and Dominion of Canada, have invented a certain new and useful Improvement in Processes of Making Carbonyl Halide, of which the following is a full, clear, concise, and exact description, reference being had to the accompanying drawings, forming a part of this specification.

My invention relates to processes of making carbonyl halide and is concerned particularly with a process of securing metals from substances in which they are associated with oxygen, with the accompanying production of carbonyl chloride or phosgene.

It will appear to those skilled in the art that my invention may be variously employed in order to secure various metals from their various compounds, with the accompanying production of phosgene, and, while I shall define the metes and bounds of my invention by the appended claims, I shall refer specifically in this disclosure to a certain process for the recovery of aluminum from alumina, clay, bauxite and similar ores, which is so conducted as to furnish phosgene as an associated product.

In my United States Letters Patent 1,238,604, issued August 28, 1917, I have set forth a process of winning metals wherein the substance containing the metal or metals is treated with a halogen in the presence of a reducing agent to form halides and a compound of the reducing agent and oxygen. In that process the arrangements and proceedings are usually such that the lower order of oxide is formed with the reducing agent. Specifically, when carbon is used as a reducing agent and there is an abundance of carbon present in the combining chamber, carbon monoxide is principally formed. However, mindful of the commercial value of phosgene, particularly in the manufacture of dyestuffs, and appreciating the presence of carbon and chlorine in the combining chamber, it is practicable to cause the formation of phosgene in large quantities in addition to the other product or products, procuring this result by limiting the amount of carbon with which the oxygen combines so that carbon dioxide would be formed instead of carbon monoxide, effecting a further reaction to produce phosgene, as will be pointed out in detail presently. I also conceived of the formation of phosgene, as part of the metal winning process, without the excess of oxygen, through the catalytic influence of iron chloride, aluminum chloride or animal matter (as when bone-black is used to provide the reducing agent), so that by following my present teachings the process of my patent referred to may be made to produce large quantities of phosgene in addition to the other product or products sought.

Referring now to a specific instance, the recovery of aluminum from alumina, I break up the compound by the use of chlorine gas so as to produce aluminum chloride, this action being carried on under special restrictions and conditions, as will later be more fully described. This action is carried on in the presence of carbon as a reducing agent, calculated to an excess of oxygen with a view to effect the formation of carbon dioxide. The carbon dioxide then apparently reacts with some of the aluminum chloride which has been formed to re-form aluminum oxide and to produce phosgene. The aluminum chloride and phosgene are then separated by fractional condensation or distillation and the aluminum may then be recovered in its elemental state by electrolysis.

In the case of treatment of clay, bauxite and similar ores, of which silicon is a substantial constituent, silicon tetrachloride is also formed and may be condensed with the phosgene, these two compounds being then separated by distillation and, if desired, the silicon may be secured in its elemental state by displacement. Other chlorides, such as iron chloride and titanium chloride, are also formed when the ore contains the additional elements, and these chlorides may also be separated from the others.

My invention will be more readily understood by reference to the accompanying drawings, in which—

Figure 1 is a more or less diagrammatic view of the chlorinizing furnace and associated apparatus;

Figure 2 is a vertical sectional view of the chlorinizing furnace; and

Figure 3 is a vertical sectional view of the electrolyzing vat.

Referring first to Figure 1, it will be seen that the chlorinizing furnace is shown at 9, and by reference to Figure 2 it will be seen that this chlorinizing furnace is of the closed type and provides for the reception of the charge 26, in which a plurality of electrodes 11—11, extending inwardly through the circular housing, as illustrated, are lodged. Each of the carbon electrodes 11 is firmly mounted in a terra cotta pipe 12, which in turn is mounted in the fire brick housing 13. Suitable means is provided to lead a suitable electric current to these electrodes. Holes 22 through which the charge in the furnace may be observed and manipulated are also provided. The charge is introduced into the chlorinizing furnace by way of a screw conveyor, indicated at 23 at the bottom of a hopper bin 24. This screw conveyor leading the charge to the passage 25 through which the charge may drop into proper position relative to the electrodes. It may be assumed, now, that the charge is alumina, of the formula $Al_2O_3$, any moisture contained in the alumina preferably having been driven therefrom. It will be noted that the furnace has only the outlet 28 and it will also be noted, as this description proceeds, that the entire system is closed as this furnace is. A graphite pipe 29 extends through the fire brick housing of the furnace and terminates in the hearth of the charge. This pipe 29 is fed through a pipe 30 from a storage tank 31, the connection being controlled by a valve 32. As will appear, this storage tank contains chlorine and it will now be seen that with the chlorine properly fed to the graphite pipe and with the current properly applied to the electrodes the activity of the chlorine gas and the heat immediately effects the disintegration of the alumina, and the formation of aluminum chloride. Reference has already been made to the fact that this action is carried on in the presence of a reducing agent. It will be kept in mind that in accordance with my present invention it is desirable to provide for an excess of oxygen, or, on the other hand, a certain deficiency of reducing agent. Since a feature of the present invention is concerned with the production of phosgene, in addition to another product or other products, carbon is employed as the reducing agent. One way to insure the formation of carbon dioxide, instead of carbon monoxide, is to begin with carbon monoxide gas as the reducing agent, which may be fed into the furnace along with the chlorine, thus making it certain that carbon dioxide shall be formed. Therefore, the graphite pipe 27 is provided, this pipe leading from a suitable storage tank, not shown, containing carbon monoxide, and passing through the fire brick housing and into the heart of the charge in the manner of the graphite pipe 29. In the presence of this reducing agent the reaction above already referred to occurs with the formation of aluminum chloride, as already stated, and with the ultimate formation of phosgene, I believe the reaction to consist of a primary and secondary reaction which may be represented as follows. First,

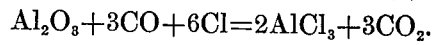

$$Al_2O_3 + 3CO + 6Cl = 2AlCl_3 + 3CO_2.$$

Thereupon a secondary reaction takes place, as follows:

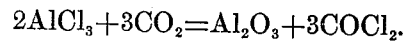

$$2AlCl_3 + 3CO_2 = Al_2O_3 + 3COCl_2.$$

Other reducing compounds may also be introduced along with, or separately from, the carbon monoxide, such as carbon tetrachloride or sulphur chloride, in which case the reactions will be modified as those skilled in the art will readily perceive.

Only a portion of the aluminum chloride formed need be turned back to alumina and the gases which naturally rise and pass out of the outlet opening 28 are aluminum chloride, phosgene, carbon dioxide, and any unaffected or restored carbon monoxide. As illustrated in Figure 1 these mixed gases are conducted to the condenser 33. This condenser is in the form of a double closed chamber providing the compartment 34 and the compartment 35 separated by a partition 36. The compartment 34 is provided with a system of cooling pipes 37, 37 which extend downwardly through and from the top of the chamber and which are distributed throughout the entire space of this particular compartment in order to get complete temperature control. The pipes 37, 37 are joined at the upper ends outside of the chamber by means of the header pipe 38 and circulation is secured in any desirable manner. In this particular condenser element the system of pipes is connected to a cold water supply, the result is that as the three gases which have been referred to enter and pass through the compartment 34, the aluminum chloride gas, which condenses at a higher temperature than phosgene, is condensed and deposits itself as a powder or as flakes upon the pipes 37, 37.

The temperatures at which these respective gases condense are, of course, well known in the art. It may be stated here that a temperature of about 400° centigrade has been found by me to be effective for carrying on the chlorinizing reactions when alumina is used as the substance treated in the chlorinizing furnace, the reactions above described as taking place in the furnace being carried on efficiently at that and higher temperatures.

Since the temperature which is produced by the circulation of mere cold water in the cooling pipes 37, 37 is not sufficiently low to condense phosgene, this gas, together with any carbon oxides which may go over, passes on to the next compartment 35 of the condenser. Thus, the first condenser element 34 is devoted to the condensation of the aluminum chloride and the powder to which it is reduced is removed from the pipes by suitable scrapers, not shown, or dropped from the pipes, on to the conveyor 42, the upper run of which passes in the direction of the arrow 43, and thus the condensed aluminum chloride is brought to the end of the condenser element where the outlet 44 leading to a tank 45 is provided. This outlet may be controlled by a valve 46. It will be noted that this tank is connected by means of a pipe 47 with a compressed air or compound CO tank 48, which is fed through the air compressor 49. It is important, as before indicated, that the system be a closed system, and the various actions may be carried on under pressure, and I speak of it particularly at this time because of the fact that the aluminum chloride to which I have just referred is extremely deliquescent and must be kept free from moisture in order to avoid decomposition and the formation of hydrochloric acid. When the system is closed, however, such a result is not possible, and the pressure has a purpose referred to later.

Leaving the aluminum chloride, which has been deposited in the tank 45, for the present, I shall follow the course of the phosgene gas and other less readily condensable gases which may have accompanied it through the second element of the condenser. The condenser element 35 is provided with a system of cooling pipes 50 like the pipes 37, these pipes having the outside header 51 which, instead of being supplied with mere cold water, is supplied with a freezing mixture of ice water, and the temperature in the condenser element 35 is therefore considerably lower than the temperature in the condenser element 34. The phosgene therefore condenses in the condenser element 35 to a colorless liquid and this liquid phosgene passes down the sloping bottom of the condenser element 35 and through the outlet 55, controlled by the valve 56, which leads to the tank 57. The condenser element 35 is provided with a conveyor 58 for the purpose of removing any solid condensate. With it will also condense as liquids any silicon chloride or titanium chloride, if the ore was not free from the compounds of these elements as impurities. These liquid chlorides may be separated from each other by fractional distillation.

Any carbon monoxide which may have accompanied the phosgene into the condenser element 35 passes out through a pipe 59, past a valve 60 and to a closed gas pump 61, it is then carried to a scrubber 62 by means of a pipe 63, this scrubber being in the form of a tank containing lime water and having an outlet pipe 63' leading therefrom. This outlet pipe is provided with a valve 64 and leads to a telescoping gas tank 65 so that pressure may be kept upon the carbon monoxide which finds its way to this tank and so that the carbon monoxide may be fed by way of a pipe 66 to any number of burners 67, 68 and 69 which are used for heating purposes and other steps in the process which will hereinafter be referred to.

Returning now to the aluminum chloride which has been deposited in the form of a powder or flakes in the tank 45, it will be noted that I have placed the burner 67 under this tank, and I may mention here that I surround the tank in practice with a suitable fire wall so that I can subject the tank to a high degree of heat. With the valve 46 closed, the material in the tank 45 can be placed under high pressure from the tank 48, and this pressure, together with the heat from the carbon monoxide burner, melts the aluminum chloride, after which step the aluminum chloride is much more stable and more easily handle, due to its physical condition, and desirably so in view of the steps which are to follow and which will be described presently. I desire to state, however, that it is feasible to conduct the aluminum chloride to the further parts of the system in its dry, unfused state. The molten aluminum chloride may then be conducted to a storage tank 88 through a pipe 89 controlled by a valve 90, the aluminum chloride being heated by a carbon monoxide flame at the burner 68 so as to be kept in a liquid condition. From this storage tank 88 the liquid aluminum chloride is conducted through a valve 91 and a pipe 92 to the electrolytic vat, which is also sealed. The electrolytic vat is illustrated in detail in Figure 3, and it will be seen that it comprises a hearth of carbon 93 and fire brick surrounding walls 94, 94 with magnesite or carbon linings 95, 95, the entire vat being surrounded by sustaining plates 96. Along opposite sides of the vat are access openings 97, 97 which are normally sealed by means of covers 98, 98 and a tap hole 99 is provided for a purpose that will be referred to presently, this tap hole being normally closed by means of the plug 100. The chlorine exit 101 is provided, and, as indicated in Figure 1, this exit is connected by means of a pipe 102 in which there is a valve 103, with a chlorine compressor 104, which in turn is connected by a pipe 105 with a chlorine cooler 106, these two elements being merely diagrammatically shown. The cooler 106 is connected by means of a pipe 107 with the chlorine tank 31 which has already been referred to, and the connecting pipe 107 is provided with a valve 108.

Returning to the detailed showing of the electrolytic vat, it will be seen that the anode is in the form of a carbon block 109 to each of which stems 110, are secured, the stems being firmly lodged in a reinforced fire brick or carbon seal cover 111. Each of the stems extend through the cover, as shown, where copper busbars 118—118 connect them and in this way the current is conveyed to the bath, the carbon hearth covered with molten aluminum acting as the opposite electrode. The center one of each set of three anode stems is drilled axially as indicated at 119 and this bore is connected to distributing passageways 120 in the corresponding graphite block. Each of these bores is connected by means of a pipe 121 with the supply pipe 92, which has been hereinbefore referred to, and a valve 122 is disposed in each pipe 121 and is intermittently operated for feeding purposes by a traveller 123 which is mounted upon a rotating shaft 124. Thus, when the various associating shafts 124 are put into operation and, as before stated, the valve 91 is opened to permit the passage of liquid aluminum chloride, a feed at uniform timerate is afforded down through the passageway 119 and into the vat. The liquid aluminum chloride is kept at a temperature of about 200° centigrade and it may be advantageously maintained under a pressure of not over 2½ atmosphere. The heated material from the storage tank is transmitted to the vat, through pipes 92 which are surrounded by pipes 125 or electric means to insure that the aluminum chloride will be fed into the vat at the proper temperature. The electrolyte is a bath of melted sodium chloride or sodium chloride and sodium fluoride at a high temperature which is primarily induced by external means, but which is maintained by the application of the current, the heat being due to the resistance of the bath. The aluminum chloride is preferably fed to the bath at such a rate as to keep the bath saturated, or at least to maintain a definite quantitative chemical relation between the bath and the charge. The action which takes place in the electrolytic bath separates the aluminum from the chlorine and leaves the sodium chloride or sodium chloride and sodium fluoride. Due to the difference in specific gravity between the pure aluminum which is thus obtained and the melted bath it is a simple matter to tap off the molten aluminum by removing the plug 100 and in this way the aluminum is secured in its elemental state.

The action is secured without electrolysis of the sodium chloride bath. The chlorine which is freed is passed to the chlorine compressor 104 into the cooler and then to the storage tank, where it is drawn from to supply the chlorinizing furnace 9, all as hereinbefore described.

Returning now to the phosgene which has deposited in the tank 57 in liquid condition, it will be seen that it may simply be drawn off or in case of its being contaminated with silicon chloride or titanium chloride, such as would be the case where bauxite is used as the charge, the contaminating chlorides may be distilled from the phosgene by properly regulating the temperature, since the boiling point of phosgene is 8.2° centigrade, which is much lower than the boiling points of silicon and titanium chlorides.

I shall now proceed to give a brief description of the application of my invention to the treatment of substances of more complicated formulæ. Taking a silicon bearing ore, a high grade of clay, such as kaolin for example, the charge may be of the formula $Al_4(SiO_4)_3$, the moisture being driven therefrom.

The process proceeds as in the case of alumina, except that it is desirable to use solid carbon, as the reducing agent on account of the high temperature of the reaction and the strength of the chemical bond between the elements in the clay. The kaolin is charged into the chlorinizing furnace as described, along with crushed and dried coke, chlorine being fed thereto by way of the pipe 29, an excess of oxygen may be present. In this case, the heat should run up to about 800° centigrade. The reaction may be represented as follows:

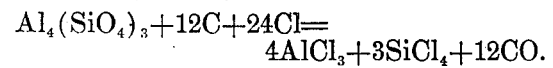

Then follows a secondary reaction which may be represented as follows:

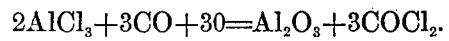

It will be noted here that in addition to the aluminum chloride and phosgene, with any carbon monoxide which may go over, there is silicon tetrachloride; and there will also be the chlorides of iron and titanium if compounds of these elements are in the ore. The condensing temperature of aluminum chloride is sufficiently high so that it will separate easily from the other compounds in the condensing chamber 34. The silicon tetrachloride condenses with the phosgene in the condensing chamber 35 to a liquid, the mixed liquids being collected in the tank 57. There the liquid chlorides may be separated from each other by distillation, by regulation of the temperature, the boiling point of phosgene being 8.2 degrees centigrade which is much lower than the boiling points of silicon and titanium tetrachlorides.

I desire to call attention to the fact that it is possible to treat the clay with chlorine in some other way than to feed the chlorine gas to the chlorinizing furnace, as has been described. I contemplate the use of compounds of chlorine to secure the reactions. For instance, I might use carbon tetrachloride or sulphur chloride and feed it into the charge in the chlorinizing furnace. I also desire to call attention to the fact that the chlorinizing furnace may be an externally heated retort instead of being heated by an arc between electrodes entering the furnace.

It will appear to those skilled in the art that this process of metal winning and phosgene production is not limited to any particular metal, even though I have cited aluminum as an instance. I have in mind titanium bearing substances and also, in a more general way, ores which contain oxides of iron, as practically all of them do, and oxides of zinc, potassium, sodium and magnesium. It is pertinent here to mention that the process is not necessarily limited strictly to metals but includes other substances which partake of the nature of metals in the reactions entailed. For instance, I secure silicon and, while strictly speaking, it is not a metal, its response in the process is analogous to that of a metal. When iron is present, it appears that the iron chloride that is formed may also serve as a catalytic agent aiding in the formation of the phosgene.

I also desire to point out that a substantial measure of my invention is entailed even though both or all the chlorides are left intact, and I have drawn some of the appended claims accordingly.

In view of the long well known general chemical similarity of the four halogens it will be apparent to those skilled in the art that in the broader aspects of my invention another halogen could be substituted for the chlorine employed, bromine, for instance, for the formation of carbonyl bromide, and I have therefore drawn some of the appended claims to adaptable halogens broadly.

I claim:

1. The process which comprises treating a substance containing oxygen and another material with an adaptable halogen, in the presence of carbon in such amount as to form carbon dioxide, to form a halide of said material and then by subsequent reaction a carbonyl halide.

2. The process which comprises treating a substance containing oxygen and another material with chlorine, in the presence of carbon in such amount as to form carbon dioxide, to form the chloride of said material and then by subsequent reaction phosgene.

3. The process which comprises treating a metallic oxide with an adaptable halogen, in the presence of carbon in such amount as to form carbon dioxide, to form a halide of the metal and then by subsequent reaction a carbonyl halide.

4. The process of securing a metal chloride and phosgene from a substance containing the metal and oxygen, which comprises treating the substance with chlorine, in the presence of carbon in such amount as to form a carbon dioxide, to form the metal chloride and then by subsequent reaction phosgene.

5. The process which comprises treating aluminum oxide with chlorine in the presence of carbon insufficient in amount to exhaust the oxygen in forming carbon monoxide thus to form carbon dioxide and aluminum chloride and then by subsequent reaction phosgene.

6. The process which comprises treating aluminum oxide with chlorine in the presence of carbon insufficient in amount to exhaust the oxygen in forming carbon monoxide thus to form carbon dioxide and aluminum chloride and then by subsequent reaction phosgene, and then separating the aluminum chloride from the phosgene.

7. The process which comprises treating aluminum oxide with chlorine in the presence of carbon insufficient in amount to exhaust the oxygen in forming carbon monoxide thus to form carbon dioxide and aluminum chloride and then by subsequent reaction phosgene, and then separating the aluminum chloride from the phosgene by fractional condensation.

8. The process which comprises treating aluminum oxide with chlorine under the influence of heat in the presence of carbon insufficient in amount to exhaust the oxygen in forming carbon monoxide thus to form carbon dioxide and aluminum chloride and then by subsequent reaction phosgene.

9. The process which comprises treating a substance containing oxygen and a plurality of other materials with chlorine in the presence of carbon insufficient in amount to exhaust the oxygen in forming carbon monoxide thus to form carbon dioxide and a chloride of each of said materials and by subsequent reaction phosgene, and then separating said first named chlorides and the phosgene.

10. The process of securing chlorides, one of which is phosgene, from a substance containing aluminum, silicon and oxygen, which comprises treating the substance with chlorine in the presence of carbon insufficient in amount to exhaust the oxygen in forming carbon monoxide thus to form carbon dioxide, aluminum chloride and silicon tetrachloride and by subsequent reaction phosgene and then separating the aluminum chloride from the other chlorides and then separating the phosgene from the silicon chloride.

11. The process of securing chlorides, one of which is phosgene from a substance containing aluminum, silicon and oxygen which comprises treating the substance with chlorine in the presence of carbon insufficient in amount to exhaust the oxygen in forming carbon monoxide thus to form carbon dioxide, aluminum chloride and silicon tetrachloride and by subsequent reaction phosgene, then separating the aluminum chloride from the other chlorides by condensation and then separating the phosgene from the silicon chloride.

12. The process of securing chlorides, one of which is phosgene from a substance containing aluminum, silicon and oxygen, which comprises treating the substance with chlorine in the presence of carbon insufficient in amount to exhaust the oxygen in forming carbon monoxide thus to form carbon dioxide, aluminum chloride and silicon tetrachloride and by subsequent reaction phosgene, then separating the aluminum chloride from the other chloride by condensation and then separating the phosgene from the silicon chloride by distillation.

13. The process which comprises treating a substance containing a metal, and silicon, with a halogen in the presence of carbon to form a compound of the metal and the halogen, a compound of silicon and the halogen and a compound of carbonyl and the halogen, then separating the halogen compounds.

14. The process of producing carbonyl chloride by the action of carbon dioxide upon aluminum chloride.

In witness whereof I hereunto subscribe my name this 28th day of December, A. D. 1917.

VICTOR M. WEAVER.